United States Patent
Bode

(10) Patent No.: US 7,027,960 B2
(45) Date of Patent: Apr. 11, 2006

(54) METHOD FOR MONITORING A TECHNICAL DEVICE

(75) Inventor: Andreas Bode, Höchstadt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/992,189

(22) Filed: Nov. 18, 2004

(65) Prior Publication Data

US 2005/0107983 A1   May 19, 2005

(30) Foreign Application Priority Data

Nov. 19, 2003   (EP) .................................. 03026648

(51) Int. Cl.
*G06F 17/00*   (2006.01)

(52) U.S. Cl. .................. 702/188; 702/182; 700/33

(58) Field of Classification Search ................ 702/188, 702/179, 60–62, 79, 182, 183, 187, 177, 702/189; 700/32–34, 56, 108, 174, 286, 700/291, 256, 295–297; 324/142

See application file for complete search history.

(56) References Cited

U.S. PATENT DOCUMENTS 4,734,866 A * 3/1988 Bartelt et al. ............... 700/256
5,930,142 A * 7/1999 Schleicher et al. ........... 700/56
6,208,953 B1 * 3/2001 Milek et al. .................... 703/7
2002/0138233 A1 * 9/2002 Chretinat ..................... 702/182

FOREIGN PATENT DOCUMENTS

| DE | 198 05 061 A1 | 8/1999 |
| DE | 199 03 826 A1 | 8/2000 |
| DE | 100 11 607 A1 | 9/2001 |
| DE | 102 08 251 A1 | 10/2002 |
| EP | 0 895 197 A1 | 2/1999 |

OTHER PUBLICATIONS

Translation of DE 199 03 826 A1, Aug. 10, 2000.*
Translation of DE 198 05 061 A1, Aug. 19, 1999.*
Translation of DE 100 11 607 A1, Sep. 20, 2001.*

* cited by examiner

*Primary Examiner*—Hal Wachsman

(57) ABSTRACT

With the method in accordance with the invention at least one monitoring limit value is defined in advance for an operating variable to be monitored of the technical device. During the operation of the technical device the current value of the operating variable to be monitored is recorded at least twice at least within a finite time interval, and within the time interval a current monitoring reference value is determined by means of an interpolation between the monitoring limit value and the current value of the operating variable to be monitored. The monitoring of the operating variable is possible immediately after the technical device has gone into operation for the first time and that the quality of the monitoring is refined as a kind of learning process as operation proceeds.

18 Claims, 3 Drawing Sheets

METHOD FOR MONITORING A TECHNICAL DEVICE

CROSS REFERENCE TO RELATED APPLICATION

This application claims priority of the European application No. 03026648.0 EP filed Nov. 19, 2003 which is incorporated by reference herein in its entirety.

FIELD OF THE INVENTION

The invention relates to a method for monitoring a technical device.

BACKGROUND OF THE INVENTION

Modern technical systems normally comprise a plurality of technical devices which interact to guarantee a desired result, for example the production of capital goods or the generation and provision of electrical energy by a power station. A failure of a technical device in the system or a device not operating at its optimum efficiency results in at least an inferior quality of the goods produced or the services provided, if not in the failure of the entire technical system.

Downtimes caused by the resulting production outages result in high consequential costs and quality deficiencies are reflected by high quality costs.

It is therefore absolutely necessary to employ diagnostic systems by means of which the technical devices of a system can be monitored.

Diagnostic systems are known in which reference values are obtained during the operation of the technical device, where monitoring starts at a point in time at which the recording of the reference is well advanced or already concluded.

The disadvantage of this method is that the time from the start of operation of the technical device until the conclusion of the learning process in respect of the recording of the reference values of the technical device is not monitored and thus faults which occur can lead to the failure of the device.

Other known analysis methods use criteria which, although they fulfill the basic requirements for operating the device (for example monitoring for a maximum permitted operating temperature being exceeded), mean that these types of methods can for example not take account of any manufacturing tolerances of the device exploited during manufacturing or specific properties of the device which only come to light during operation or detect small deviations which do not lead to failure but which do pose a risk to optimum operation.

SUMMARY OF THE INVENTION

The object of the invention is thus to specify an improved method for monitoring a technical device which overcomes the disadvantages mentioned and is simple to implement.

The object is achieved in accordance with the invention by a method for monitoring a technical device with the following steps:

At least one monitoring limit value is defined in advance for the technical device operating variable to be monitored.

During the operation of the technical device the current value of the operating variable to be monitored is recorded at least twice at least within a finite time interval and Within the time interval a current monitoring reference value is determined by means of an interpolation between the monitoring limit value and the current value of the operating variable to be monitored.

The basic premise for the invention is the idea that the technical device can be monitored in a particularly reliable way reliable way if both basic general conditions, such as for example the maximum operating temperature mentioned above, and also specific operation-related information such as one or more operating variables to be monitored, are processed to form a monitoring reference value with which the actual behavior of the operating variable to be monitored is compared.

The method in accordance with the invention thus provides for a monitoring reference value which refines itself during the operation of the technical device.

At the time that the technical device starts operation the influence of the monitoring limit value on the current monitoring reference value predominates, with the current monitoring reference value being ever more heavily influenced by the current operating behavior as operation proceeds, so that as a result, during operation of the device even smaller deviations from normal operation of the operating variable to be monitored can be detected. This means that not only operating states from which an impending failure of the device can be deduced, but also those which deviate from their optimum without necessarily heralding a failure are detected.

With the method in accordance with the invention a learning process regarding the determination of the monitoring reference value is thus provided, where, as the volume of information obtained from the operation of the technical device increases, a current monitoring reference value is refined.

It is further possible to begin monitoring the technical device as soon as it starts operating for the first time, since the monitoring limit value is available right from the start as a first current monitoring reference value.

By contrast, with known analysis algorithms, it is necessary to wait until a learning process has completed before a monitoring reference value is available and monitoring can begin.

In an advantageous embodiment the current monitoring reference value is determined at least twice.

This refines the desired adaptation of the current monitoring reference value to the actual operating behavior, since, from the second determination of the current monitoring reference value, the previous monitoring reference value is used as the monitoring limit value.

Thus a current monitoring reference value which refines itself dynamically in the form of a learning process is obtained.

In a further advantageous embodiment the start point of the time interval coincides with the start of operation of the technical device, so that it is possible to assess the operating variable to be monitored right from the time that the technical device first goes into operation.

Advantageously there is ongoing recording within the time interval of the current value of the operating variable to be monitored, preferably at fixed time intervals.

In this way the precision and suitability of the current monitoring reference value is refined for diagnostic purposes through the ongoing learning process.

Preferably the current monitoring reference value is also determined within the time interval on an ongoing basis, preferably at fixed time intervals, with the previous monitoring reference value in each case being used as monitoring limit value once the value has been determined for a second time.

In accordance with a further exemplary embodiment the end point of the time interval is determined in advance.

In this embodiment empirical values are employed, whereby, after a certain period of time in the learning process, the monitoring reference value for further monitoring is available with sufficient precision and does not have to be refined further. This constitutes a compromise between the ability to rapidly deploy the method in accordance with the invention and the necessity for a lengthy learning process when determining a most accurate possible monitoring reference value. In very many practical applications it will be possible to define the end time of the time interval in advance and thus obtain a defined end time of the learning process without having to dispense with a degree of accuracy of the monitoring reference value.

In another embodiment the end point of the time interval is determined by means of the current values of the operating variable to be monitored and of the monitoring reference value.

In this exemplary embodiment the absolute end point depends on the relationship between the current monitoring reference value and the current value of the operating variable to be monitored. For example—if the monitoring reference value is very close to the current value of the operating variable to be monitored—the learning process can be declared to be finished although a certain improvement could be expected, but is not seen as significant however. It is thus possible that, for certain applications of the method in accordance with the invention, it is possible for the learning process to be concluded very quickly and for monitoring to be able to be conducted without any lengthy underlying learning process.

Preferably the interpolation is performed by means of a mathematical function which especially advantageously includes interpolation from the group {linear interpolation, quadratic interpolation, cubic interpolation, interpolation by means of spline functions}.

These known methods of interpolation are exhaustively illustrated in specialist mathematical literature and can be mastered by a person skilled in the art in conjunction with the method in accordance with the invention.

Furthermore it is advantageous if a violation of the current monitoring reference value by the current value of the operating variable is detected, in which case the violation can involve exceeding or undershooting the current monitoring reference value.

Depending on the application, a current value for the operating variable to be monitored which is too large or too small can signify a deviation from normal operation or even a danger. It is therefore important to identify such violations and to generate the corresponding warning messages or even to intervene in the operation of the technical device.

The violation can also include the current value of the operating variable entering a tolerance band around the current monitoring reference value.

In this case, not only is the major violation of the current monitoring reference value determined, but the case in which the current value of the operating variable approaches the current monitoring reference value is also detected. This means that the corresponding trend in the operating variable to be monitored can be evaluated in advance of a major violation and follow-up measures, for example generation of warning messages or interventions into the operation of the technical device, can be created.

In an especially preferred embodiment the detection of a violation is undertaken as from the start of operation of the technical device. Start of operation here is taken to mean in particular the first time the technical device is put into operation, at which point no information is yet available about the behavior of the operating variable to be monitored during operation.

Monitoring is possible despite this however in accordance with the inventive method, since at the given start time of operation at least the monitoring limit value defined in advance is used as a current monitoring reference value, and this is refined as operation proceeds. Thus although monitoring is not optimal as regards quality at the time that the system first starts operation, it is at least available so that at least more general violations, for example the monitoring limit value being exceeded by the current value, can be detected.

In a further advantageous embodiment the current monitoring reference value is no longer changed as from the end of the time interval.

With the end of the time interval the learning process is regarded as completed in this case and no further resources for determining the monitoring reference value are needed. As already mentioned, the end point of the time interval can be determined in advance here or can be derived dynamically from the current values of the operating variable to be monitored and of the monitoring reference value.

BRIEF DESCRIPTION OF THE DRAWING

An exemplary embodiment of the invention is explained in more detail below.

The figure shows.

DETAILED DESCRIPTION OF THE INVENTION

Figure 1:
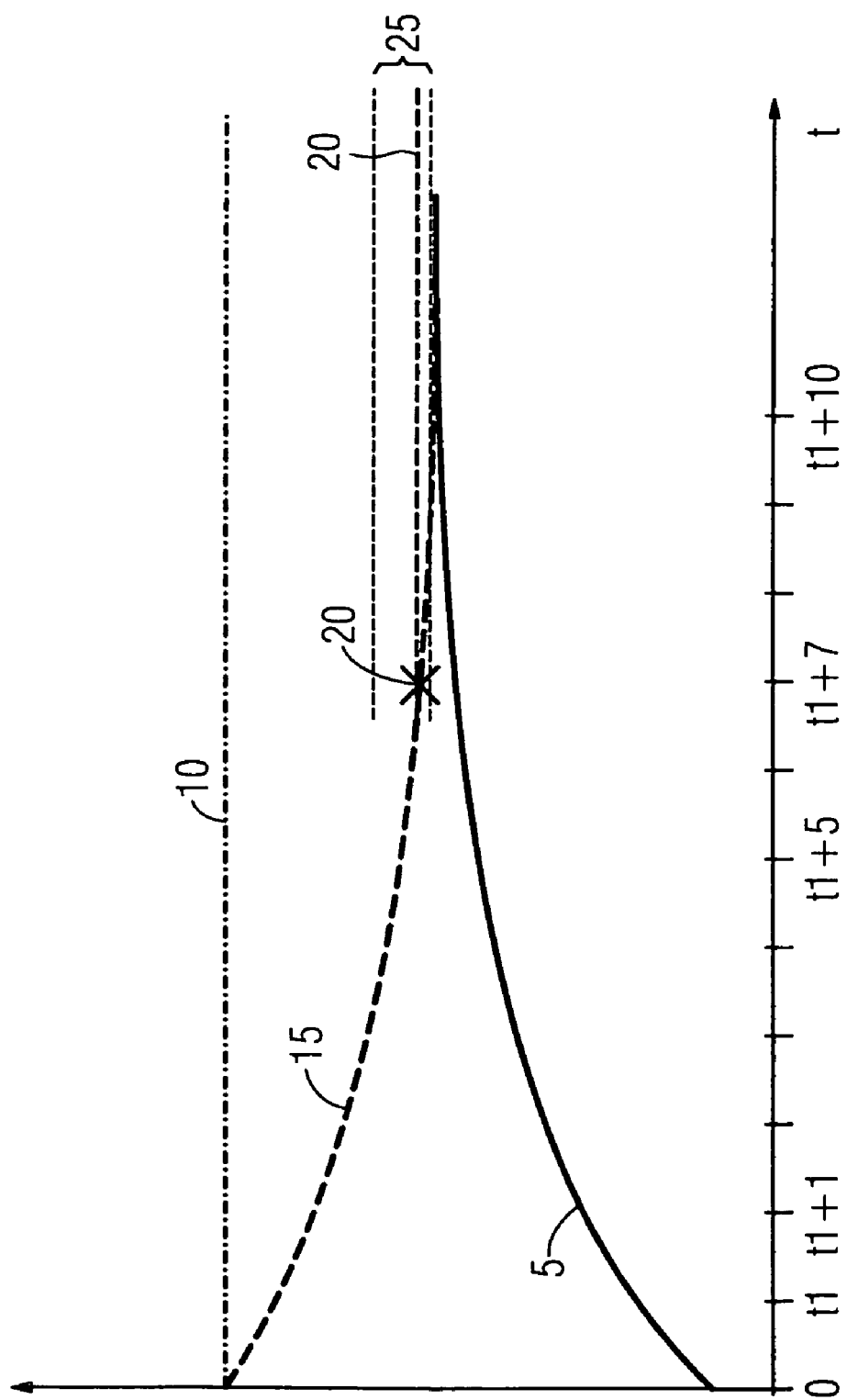
FIG. 1 shows the typical behavior of the monitoring reference value and of the operating variable to be monitored during operation of a technical device to illustrate the method in accordance with the invention.
Figure 2:
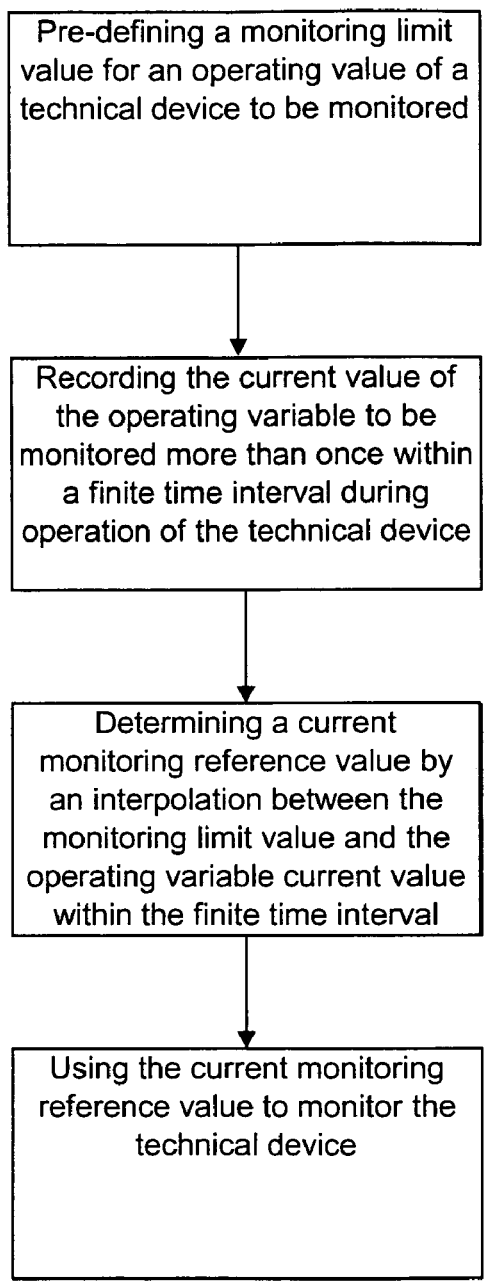
FIG. 2 is a flowchart of the method as applied to a technical device.
Figure 3:
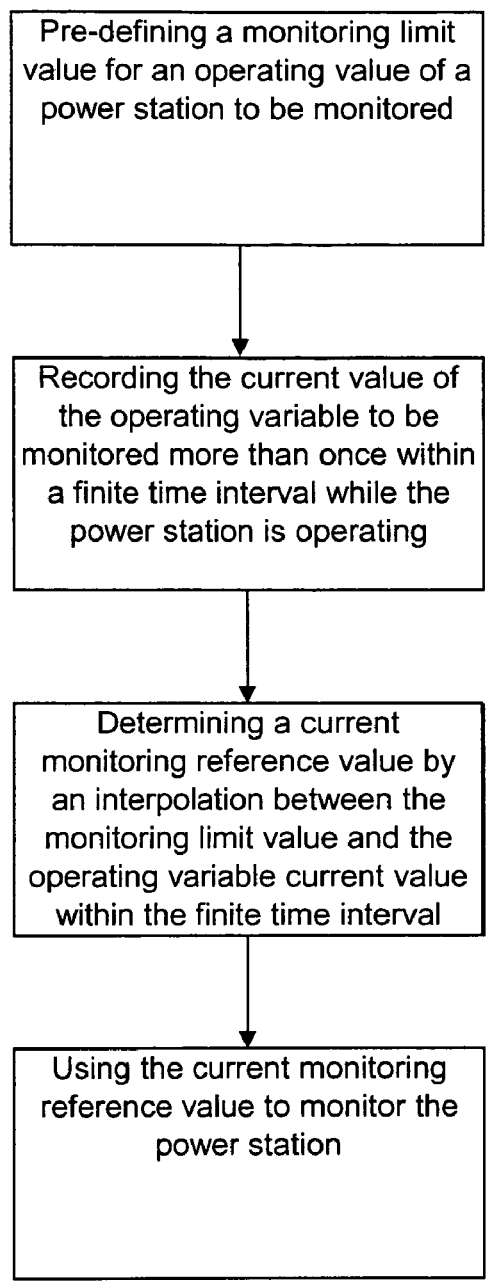
FIG. 3 is a flowchart of the method as applied to a power station.

The Figure shows the timing behavior of an operating variable 5 to be monitored. This variable can for example be a measured bearing temperature which increases with increasing operating time and asymptotically approaches a specific value in accordance with normal continuous operation.

A monitoring limit value 10 can for example comprise a limit temperature which may not be exceeded to prevent the bearing from being destroyed. This monitoring limit value 10 depends here on the type and material of the bearing and is usually very much higher than the temperature reached in normal continuous operation of the bearing.

Despite this it can make sense to at least check the operating variable 5 to be monitored to ensure that it does not exceed the monitoring limit value 10 since for example a defective bearing can very quickly exhibit these types of high bearing temperatures. As from the point in time 0 when the device first goes into operation the current value of the operating variable to be monitored 5 is measured at points t1, t1+1, t1+2, . . . . A current monitoring reference value 15 is determined with the aid of the monitoring limit value 10 and of the current value of the operating variable 5 to be monitored.

The current value of the monitoring reference value 15 is used in each case to assess the current value of the operating variable to be monitored 5. In particular the method detects in this case whether the current value of the operating variable 5 is overshooting or undershooting the value of the monitoring reference value 15 available at a particular point in time. Since the monitoring reference value 15 is influenced by the actual behavior of the operating variable 5, this monitoring reference value 15 is better suited for monitoring a technical device than the monitoring limit value 10 for which violation means in most cases that the device is already at risk or damaged.

By contrast, comparing the current value of the operating variable 5 with the current value of the monitoring reference value 15 retains information as to how far the current value of the operating variable 5 is from the desired normal operation without this having to involve a risk to or the possibility of damage to the technical device.

As from point t1+7 the current value of the monitoring reference value 15 present at this point in time is used as a basis for the monitoring value 20 for further monitoring of the technical device, so that for example the current value of the operating variable 5 is also compared at point t1+10 with the value of the monitoring reference value, the monitoring value 20, already available at point t1+7.

This comparison can for example also include a check as to whether the current value of the operating variable 5 has entered a tolerance band 25 around the monitoring value 20.

This tolerance band 25 can for example represent the operating range within which a current value of the operating variable 5 no longer guarantees optimum operation of the technical device.

To determine the monitoring reference value 15 from the monitoring limit value 10 and the current value of the operating variable 5, an interpolation method is employed, typically a linear interpolation between said variables. However any other mathematical functions can also be used for this.

In summary the method in accordance with the invention can be represented as follows:

Starting from a monitoring limit value 10 defined in advance, which for example represents a limit beyond which damage would occur, the actual behavior of the operating variable is used to determine a monitoring reference value 15 in a learning process which is used as a basis for further monitoring of the operating variable 5 instead of the monitoring limit value 10.

The invention claimed is:

1. A method for monitoring a technical device, comprising:
pre-defining a monitoring limit value for an operating variable of the technical device to be monitored;
recording the current value of the operating variable to be monitored more than once and within a finite time interval during operation of the technical device;
determining a current monitoring reference value by an interpolation between the monitoring limit value and the current value of the operating variable to be monitored, within the finite time interval; and
using the current monitoring reference value to monitor the technical device.

2. The method in accordance with claim 1, wherein the current monitoring reference value is determined more than once and a previous monitoring reference value becomes the monitoring limit value once the previous monitoring reference value has been determined.

3. The method in accordance with claim 1, wherein the start of the finite time interval coincides with the start of operation of the technical device.

4. The method in accordance with claim 1, wherein the current value of the operating variable to be monitored is determined continuously.

5. The method in accordance with claim 4, wherein the current value of the operating variable to be monitored is determined at fixed intervals within the finite time interval.

6. The method in accordance with claim 1, wherein the current monitoring reference value is determined continuously and a previous monitoring reference value is used as the current monitoring limit value after the previous monitoring reference value has been determined more than once.

7. The method in accordance with claim 6, wherein the current monitoring reference value is determined at fixed time intervals and a previous monitoring reference value is used as the current monitoring limit value after the previous monitoring reference value has been determined more than once.

8. The method in accordance with claim 1, wherein the end point of the finite time interval is defined in advance.

9. The method in accordance with claim 1, wherein the end point of the finite time interval is determined by the current value of the operating variable to be monitored and of the monitoring reference value.

10. The method in accordance with claim 1, wherein the interpolation is performed by a mathematical function.

11. The method in accordance with claim 10, wherein the interpolation method is selected from the group consisting of: linear interpolation, quadratic interpolation, cubic interpolation, and interpolation by spline functions.

12. The method in accordance with claim 1, wherein a violation of the current monitoring reference value is detected by monitoring the current value of the operating variable.

13. The method in accordance with claim 12, wherein the violation comprises an overshoot or undershoot of the current monitoring reference value.

14. The method in accordance with claim 13, wherein the detection of the violation is undertaken as from the start of operation of the technical device.

15. The method in accordance with claim 12, wherein the violation comprises an entry of the current value of the operating variable into a tolerance band near in value to the current monitoring reference value.

16. The method in accordance with claim 1, wherein the current monitoring reference value is not changed after the completion of the finite time interval.

17. A method for monitoring a power station, comprising:
pre-defining a monitoring limit value for an operating variable of the power station to be monitored;
recording the current value of the operating variable to be monitored more than once and during a finite time interval while the power station is operating;
determining a current monitoring reference value by interpolating between the monitoring limit value and the current value of the operating variable to be monitored during the finite time interval; and
using the current monitoring reference value to monitor the power station.

18. The method in accordance with claim 17, wherein the current monitoring reference value is determined more than once and a previous monitoring reference value becomes the monitoring limit value once the previous monitoring reference value has been determined.

* * * * *